Nov. 26, 1957  H. J. SPENCER  2,814,042
FASTENER APPLYING DEVICE
Filed March 8, 1956  3 Sheets-Sheet 1

INVENTOR.
BY  Herman J. Spencer

Nov. 26, 1957 — H. J. SPENCER — 2,814,042
FASTENER APPLYING DEVICE
Filed March 8, 1956 — 3 Sheets-Sheet 2

INVENTOR.
BY Herman J. Spencer

Nov. 26, 1957      H. J. SPENCER      2,814,042
FASTENER APPLYING DEVICE

Filed March 8, 1956      3 Sheets-Sheet 3

INVENTOR.
BY Herman J. Spencer

United States Patent Office 2,814,042
Patented Nov. 26, 1957

2,814,042
FASTENER APPLYING DEVICE
Herman J. Spencer, Ingomar, Pa.

Application March 8, 1956, Serial No. 570,378

5 Claims. (Cl. 1—49)

This invention relates to improvements in a device for stapling multiple thicknesses of material together.

This application contains improvements to the mechanisms described in my applications No. 420,079, No. 544,435, and Patent No. 2,427,028.

In the above mentioned applications and patent, the anvil plates protrude below the base line of the machine, and this condition required that the stitcher be lifted bodily from the material each time a staple was secured. It is desirable, in many instances, that the stitcher slide along the material from one stapling position to another and therefore it becomes necessary to use retractable anvil plates.

One object of this invention is to provide means for retracting the anvil plates in a stitcher of simple design.

Another object is to provide means to positively control movement of the support bar during the driving of a staple and means for releasing the first means to permit the driver to be retracted without positively reversing movement of the support bar.

Still another object is to provide means for quick, easy adjustment to the anvil plates and to permit the die plates with their pivots to be reciprocated vertically in relation to the adjustment means.

A further preferred object is to provide a positive means for shifting the anvil plates out of their staple bending position and to hold them in this position while they are reciprocated vertically by the driver.

In the accompanying drawings which illustrate a preferred and modified embodiment of my invention—

Figure 9:
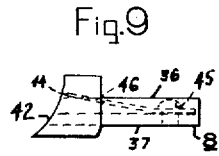
Figure 9 is a vertical longitudinal view of the support bar.
Figure 10:
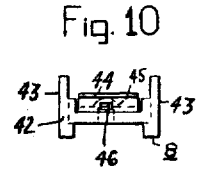
Figure 11:
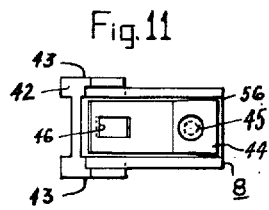
Figure 12:
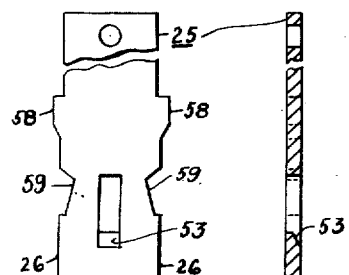
Figure 13:
Figure 14:
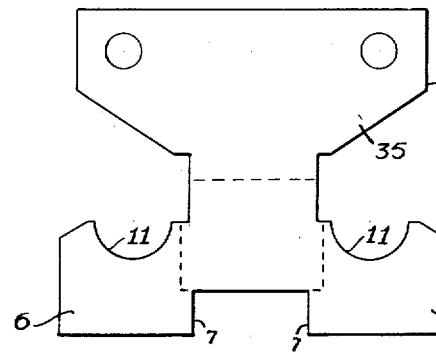
Figure 15:
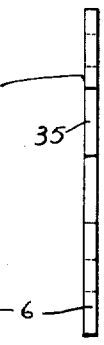
Figures 16, 17:
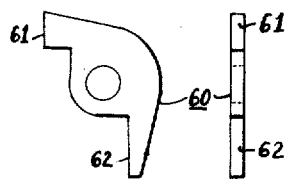
Figures 18, 19:
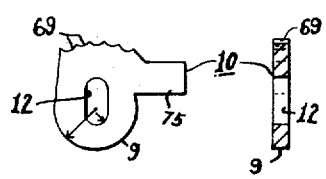
Figure 20:
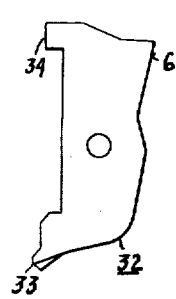
Figure 21:
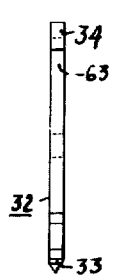
Figure 22:
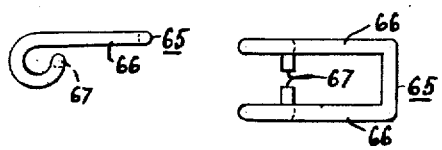
Figure 23:
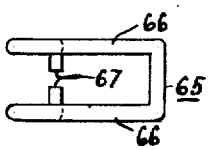

Figure 10 is an end view of Figure 9;
Figure 11 is a plan view of Figure 9;
Figure 12 is a plan view of the driver;
Figure 13 is a side view in section of the driver;
Figure 14 is a plan view of the front support plate with dash lines illustrating that the two lower corners are used as two rear support plates and that the upper portion above the horizontal dash lines is used as a rear spacer plate;
Figure 15 is a side view of Figure 14;
Figure 16 is a plan view of the anvil plate arm;
Figure 17 is a side view thereof;
Figure 18 is a plan view of one of the four eccentric plates and Figure 19 is a side sectional view thereof;
Figure 20 is a plan view of one of the anvil plates and Figure 21 is a side view thereof;
Figure 22 is a front side view and Figure 23 is a plan view of the spring used to hold the eccentric plates in their proper position.

Figure 7:
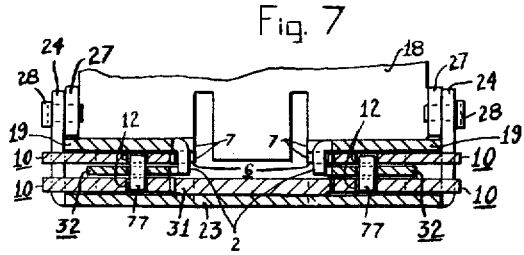
Figure 7 is a plan view through VII—VII of Figure 2 to illustrate the positions of the parts.

The stitcher has a frame 1 which has a vertically extending rear plate 19 adjacent to and across the front end of the stitcher which has a spacer plate 35 attached to its forwardly side to guide the rearwardly side of the driver 25. The rear plate 19 has upper spaced-apart parallel vertical flanges 76 extending forwardly a short distance which act as sidewardly guides for the upper sidewardly edges 26 of the driver 25 to hold it in proper alignment as it is reciprocated vertically in relation to the frame 1. A centrally located notched opening is provided at the lower end of rear plate 19 and a section of each of the vertical edges of the notched opening are provided with flanges 2 which extend forwardly a short distance to provde sidewardly guides for staples fed into position beneath the driver 25 and to guide the lower ends of the sidewardly edges 26 of the driver 25 as it descends to drive the staple. See Figures 2 and 7.

Frame 1 has a horizontal base plate 18 extending towards the opposite end of the stitcher to act as a base. The conventional U-shaped staple guide 3 extends longitudinally in the stitcher and the outside of its web 4 is attached centrally to the upper side of base plate 18 with the forwardly ends of flanges 5 of the staple guide 3 terminating at the rearwardly side of the driver 25 for guiding staples into position beneath it. The inverted U-shaped staples S straddle the flanges 5 of the staple guide 3 and the web 17 of an inverted U-shaped holddown member 78 overlies the staples to hold them in proper alignment on the staple guide 3.

Figure 1:
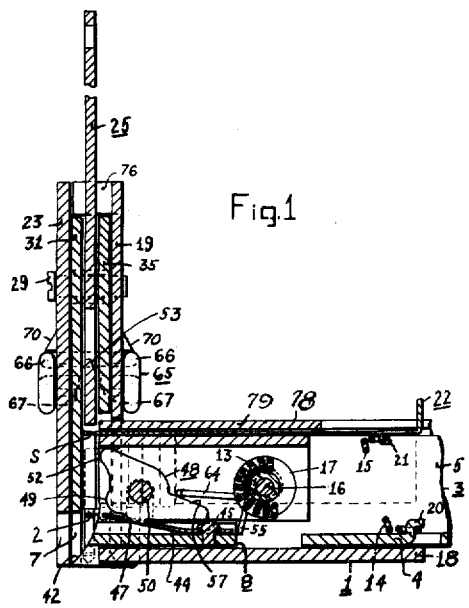
Figure 1 is a vertical longitudinal section through the stitcher mechanism with the parts in their starting position.

A pulley 17 is mounted on shaft 16 that has its ends supported in the forwardly ends of flanges 5 of the staple guide 3. A feeder spring 13 is looped around pulley 17 with its lower end 14 held by a rearwardly positioned lug 20 turned up from the web 4 of the staple guide 3 and spring's 15 other end is attached to the depending lug 21 on the conventional inverted U-shaped pusher 22 to urge it to push staples S along the staple guide 3 to a position beneath the driver 25. See Figures 1 and 2.

A rear spacer plate 35 (Figure 1) has identical left and right hand rear support plates 6 (Figure 14) secured flatwise equal distance from a vertical center line to the lower part of the forwardly side of rear plate 19 (Figures 1 and 5) of the frame 1. The rear support plates 6 have short vertically extending edges 7 that face each other to act as sidewardly guides to properly position a movable staple support bar 8 which will be described later and a section of the forwardly facing side of the support plates 6 adjacent to their vertical edges 7 acts as a rearwardly guide for the back of the legs of a staple as it is ejected from the stitcher. See Figures 4, 14 and 15. The upwardly facing edges 11 of the rear support plates 6 are shaped like the lower half of a circle and the rounded ends 9 of the identical left and right hand eccentric plates 10 are pivotally supported in the half-circle shape 11 for reasons to be described. It will be noted in Figures 18 and 19 that the body portion of the eccentric plates 10 have a short vertically extending closed slot 12 which is radiused at its lower end and further that the center point of the radius at said lower end of slot 12 which is indicated by the short arrow in Figure 18 is at a point vertically below the center point of the radius used to form the rounded end 9 of the eccentric plate 10 which is indicated by the long arrow in Figure 18 so that tilting or pivoting of the eccentric plate 10 on its rounded end 9 will swing the pivot point of radius at the lower end of slot 12 in the eccentric plate 10 in an arc around the pivot point of its rounded end 9 to thereby permit the center point of the radius at the lower end of slot 12 to be moved towards and away from the center of the stitcher for reasons to be described later. See Figures 2, 4, 14, 18 and 19.

A front plate 23 is parallel to and spaced apart from the rear plate 19 of the frame 1. The front plate 23 has arms 24 extending from its lower sidewardly edges towards the opposite end of the stitcher that are attached to the sidewardly vertical flanges 27 of the horizontal plate 18 of the frame 1 by screws 28. The upper portions of the front plate 23 and the rear plate 19 are held together by screws 29 and in proper distance apart by spacer sleeves 30 mounted centrally on screws 29.

A front support plate 31 (Figures 1 and 5) identical with support plate 35 (Figures 14 and 15) has vertical edges 7 and left and right hand half-circle shapes 11 to match those on the rear support plates 6. The rearwardly facing side of the front support plate 31 acts as a front guide for the driver 25 and for staples S as they are driven and its half-circle shapes 11 support left and right hand eccentric plates 10 which are spaced apart from their counterparts supported in the rear support plates 6 to thereby provide a working space for the anvil plates 32.

Anvil plates 32 are positioned flatwise between the front and rear eccentric plates 10 and are pivotally mounted on the central portion of pins 77 which have their longitudinally extending ends entered in the closed end slots 12 of the front and rear eccentric plates 10 to permit pins 77 and the anvil plates 32 to be moved relative to the eccentric plates 10. At their lower ends, the die plates 32 have inwardly curved projections 33 effective to bend the legs of a staple progressively as it is driven downwardly therebetween, as will be described more fully later. The projections 33 are sharpened as clearly shown in Figure 21 to facilitate penetration thereby of a thickness of material to be stapled. The inwardly edges of the upper ends of the anvil plates 32 are shaped as at 34 to bear on the outwardly vertical edges 26 which extend the full length of the driving blade 25. This limits outward movement of the projections 33 when the upper ends 34 of the anvil plates 32 are in contact with the edges 26 of the driver 25.

The plate-like driver 25 lies flatwise against the forwardly side of the rear spacer plate 35 of the frame 1 and the driver can be reciprocated vertically by hand or by mechanical means to eject a staple downwardly from the stitcher. See Figures 2, 4 and 6. A movable support bar 8 has a rectangular body portion which extends rearwardly, its parallel side portions 36 are guided by the inwardly sides of flanges 5 of the staple guide 3 with its aligned upper 36 and bottom 37 surfaces being guided during longitudinal movement by the upper side 38 of base plate 18 of the frame 1 and by the downwardly facing edges 39 of flanges 40 of the inverted U-shaped bracket 41. The inverted U-shaped bracket 41 is secured to and between the forwardly ends of flanges 5 of the staple guide 3. The support bar 8 has a curved face 42 at its forwardly end which normally extends between the vertical edges 7 of the rear support plates 6 and the aligned vertical edges 7 of the front support plate 31. The sidewardly portions 43 adjacent to the curved face 42 of the support bar 8 are guided by the vertical edges 7. See Figures 1, 2 and 11.

The longitudinally extending flat spring 44 has its opposite end riveted flatwise to the opposite end of the upper side of the support bar 8 by rivet 45. The forwardly end of spring 44 is pierced to provide a hole 46 for engagement with a lug 47 on the control arm 48 to pivot it counterclockwise and this end of spring 44 is constantly urged into engagement with lug 47. A space is provided between the hole 46 end of spring 44 and the upper side of the support bar 8 to permit the hole 46 end of spring 44 to be moved downwardly out of engagement with lug 47 by the cam bump 49 on the control arm 48 when the bump 49 contacts the hole 46 end of spring 44 during counterclockwise rotation of the control arm 48 to disengage it from spring 44. The control arm 48 is pivoted on the center portion of shaft 50 which has its transversely extending ends supported in the closed upper ends of aligned open end slots 51 in the flanges 40 of the inverted U-shaped bracket 41. The upper part of the control arm 48 has a forwardly extending lug 52 adapted to control counterclockwise rotation of the control arm 48 on shaft 50 by its engagement with the rearwardly facing angled section 53 in the body portion of the driver 25 as the driver is reciprocated. The hole 46 end of spring 44 is almost constantly pressing upwardly against a portion of the control arm 48 and thereby holds shaft 50 upwardly against the closed upper ends of slots 51. A spring 54 is coiled around shaft 16 with one leg 55 against the opposite end 56 of the support bar 8 to urge it into staple supporting position and spring 54 has its other leg resting on the upper side of lug 57 of the control arm 48 to urge it clockwise on pin 50. See Figures 1, 3, 5, 9, 10 and 11.

The sidewardly edges 26 of the driver 25 extend outwardly close by its upper end to form cams 58 which are adapted to shift the upper ends 34 of the anvil plates 32 outwardly to shift their projections 33 into staple bending position and a short distance below said cams 58 are notches 59 which are adapted to latch onto the shaped upper ends 34 of the anvil plates 32 to move them and pins 77 bodily up and down as the driver is reciprocated. See Figures 2, 4, 6, 12, 13, 20 and 21. Left and right hand anvil plate arms 60 are pivotally mounted between the front plate 23 and the rear plate 19 on spacer sleeves 30 on screws 29 supported in said plates. The upper ends 61 of anvil plate arms 60 are adapted to be swung upwardly a limited amount and held steady by the cam section 58 of the driver 25 as it is moved upwardly to thereby swing the downwardly extending portions 62 of the anvil plate arms 60 against the outwardly edges 63 of the upper end of the anvil plates 32 to shift and then hold their upper ends 34 in notches 59 of the driver 25 as it is reciprocated. See Figures 2 and 4.

The structure of the preferred form of the stitcher having been described, the operation of the device is as follows: Assuming that the parts are initially in the positions indicated in Figures 1 and 2 and that a supply of staples are in position on the staple guide bar 3 with one of the staples in position beneath the driver 25, the stitcher is placed on the multiple thickness to be secured together. The driver 25 is moved downwardly in fastener applying direction by any suitable means and as the driver 25 is moved downwardly its lower end moves the leading staple S downwardly with the staple's legs straddling the sidewardly portions 43 and the under-side of the staple's crown rubbing along the curved face 42 of the support bar 8 to thereby shift it progressively towards the opposite end of the stitcher. See Figures 1, 2, 3, 4 and 6. When the support bar 8 starts to be moved rearwardly, as described above, the lug 47 of the control arm 48 is in hole 46 of spring 44 carried by support bar 8 and control arm 48 is thereby pivoted counterclockwise on shaft 50 and the upper lug 52 on the control arm 48 is thereby shifted into restrictive engagement with the rearwardly facing angled section 53 of the driver 25 to thereby rigidly connect the shifting of the support bar 8 with the downward movement of the driver 25.

Figure 2:
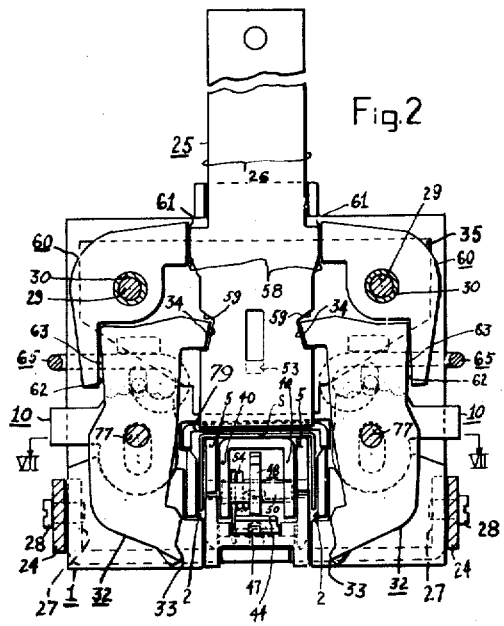
Figure 2 is an end elevation with parts forwardly from the driver removed to illustrate the parts in the same positions shown in Figure 1.
Figure 4:
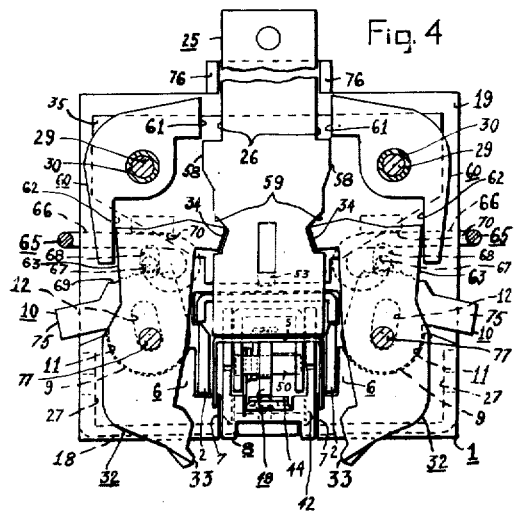
Figure 4 is an end elevation similar to Figure 2 but showing the driver as having been lowered to thereby partially drive a staple and showing the driver as having moved the anvil plates downward until their projections extend out of the stitcher to thereby penetrate material to be stapled.

During the initial downward movement of the driver 25, its cams 58 are in alignment and engagement with the shaped upper ends 61 of the anvil plate arms 60 to stop them from pivoting on spacer sleeves 30 with the vertical downwardly extending portions 62 of the anvil plate arms 60 against the outwardly edges 63 of the upper ends of the anvil plates 32 to thereby rigidly hold their inwardly shaped upper ends 34 confined in notches 59 of the driver 25 so downward movement of it will move the anvil plates 32 downwardly from a position shown in Figure 2 to the position shown in Figure 4.

The anvil plates 32 with pins 77 carried thereby having moved downwardly by the driver 25 until the ends of the pins 77 are stopped by the lower end of the slots 12 in eccentric plates 10, upper edges 61 of plate arms 60 are now above the cams 58 of the driver 25 (Figure 4) to permit free rotation of arms 60 about their pivots 29. It will be observed in Figures 3 and 4 that the sharpened projections 33 of the anvil plates 32 were moved downwardly out of the stitcher to thereby penetrate material and that continued downward movement of the driver 25 forces the shaped upper ends 34 of the anvil plates 32 to follow the outwardly sloping contour of the outwardly edges 26 and cams 58 of the driver 25 to thereby shift the projections 33 of the anvil plates 32 inwardly to their staple bending position shown in Figure 6.

Figure 6:
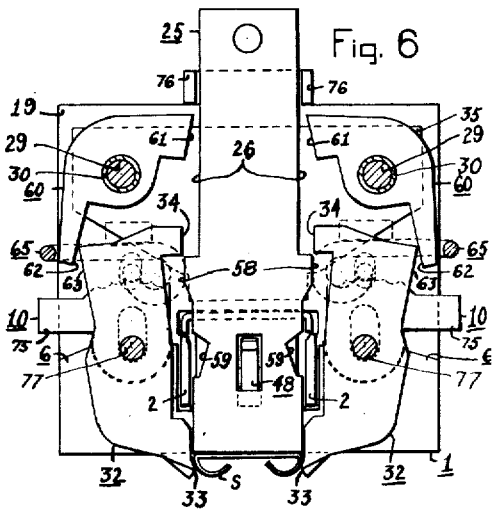
Figure 6 is an end view elevation similar to Figure 4, showing the parts after a staple has been completely driven and it corresponds to Figure 3.

As the lower ends of the staple's legs are engaged by the projections 33 of the anvil plates 32, they are curved inwardly around the lower corners of the support bar 8, as shown in Figure 6. As this inward curving of the staple's legs commences, the upper portions of the legs are held against inward bending by the lower portion of the sides 43 of the support bar 8 which still projects between the staple legs.

On further descent of the driver, the curving of the staple legs continues progressively, to effect tight clinching by the time the driver reaches its lowermost position as shown in Figure 6. The depth to which the staple legs penetrate depends on the curvature imparted thereto and this in turn is governed by the initial setting of the projections 33. This setting may be adjusted, as already explained, by pivoting the eccentric plates 10 on their rounded ends 9 as shown in Figures 2, 4, 18 and 19 to move the center point of the radius at the lower ends of the slots 12 of the eccentric plates 10 in relation to the center point of the radius of the rounded ends 9 to thereby change the positions of projections 33 when they are in the lower ends of slots 12.

Figure 3:
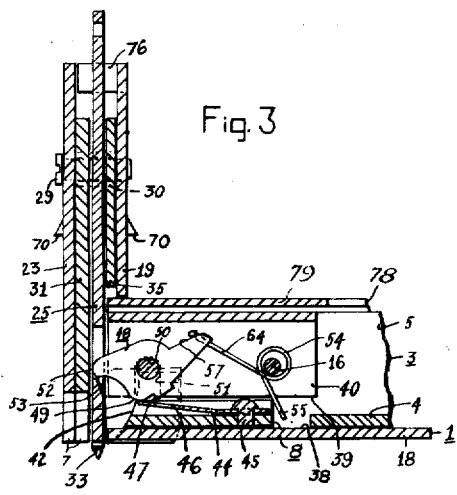
Figure 3 is a vertical longitudinal section through the stitcher with the parts shown after a staple has been driven.
Figure 5:
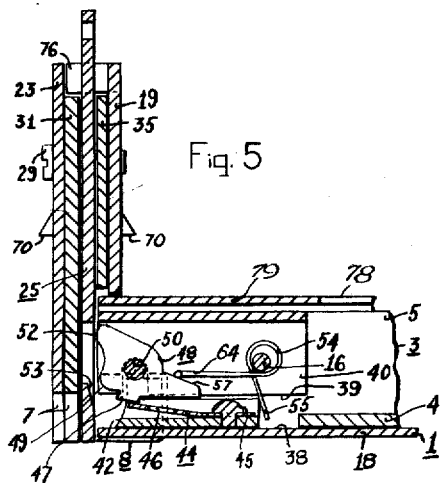
Figure 5 is a vertical longitudinal view in section with the parts in the same position shown in Figure 3 but showing the control arm released from engagement with the support bar and as having been returned to its starting position by leg 55 of spring 54.

When the driver 25 has reached the lowermost position shown in Figures 3 and 6, the bump 49 on the control arm 48 has forced the hole 46 end of spring 44 downwardly out of engagement with lug 47 and spring leg 64 of spring 54 immediately urges the control arm 48 to pivot clockwise on shaft 16 to its initial position to thereby move lug 47 forwardly in an arc away from hole 46 as shown in Figure 5 and as the driver 25 is moved upwardly, the support bar 8 is urged forwardly by spring leg 55 of the spring 54 until hole 46 of spring 44 snaps upwardly to again engage lug 47 of the control arm 48 to thereby stop forward movement of the support bar 8. See Figures 1, 3 and 5.

U-shaped springs 65 have legs 66 extending horizontally centerwise with looped ends doubled back below their legs 66 and have short ends 67 turned towards each other which extend through close fitting aligned vertical slots 68 in the front plate 23 and rear plate 19 to exert downward pressure on the upwardly facing notched edges 69 of the eccentric plates 10 to hold their rounded ends 9 firmly seated in the half-circle shapes 11 of the front and rear support plates. See Figures 1, 2, 22 and 23.

Wide faced lugs 70 (Figure 1) pressed forwardly from the front plate 23 and rearwardly from the rear plate 19 are against the upwardly side of legs 66 of spring 65 and the short ends 67 of spring 65 are centered below lugs 70 to retain the spring legs 66 firmly in line with lugs 70, as shown. When the eccentric plates are adjusted, by pushing or pulling their exposed extensions 75, the short ends 67 of spring 65 move vertically in slots 68 along notches 69 of the eccentric plates 10 to thereby hold them from moving out of a set adjustment.

The apparatus described above operates satisfactorily when stiff material is to be penetrated by the anvil plates. However, when light material is to be penetrated, it is not necessary to rigidly hold the anvil plates in their open position as they penetrate the material, so I employ a more economical modified method as is shown in Figure 8.

Figure 8:
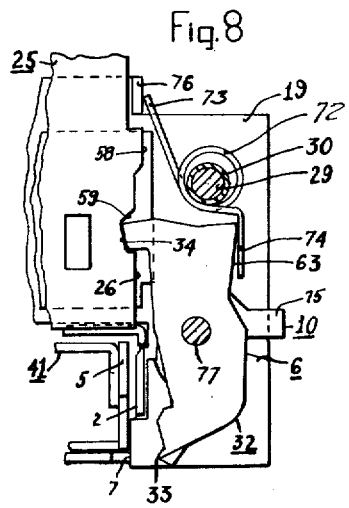
Figure 8 is an exposed end elevation similar to Figure 2 of one side of the stitcher showing a modified means for holding the upper end of the anvil plates in engagement with the outwardly edge of the driver.

As shown in the drawings, the modified form of the stitcher, shown in Figure 8, is generally similar to that already described, corresponding parts being designated by the same reference numerals. Left and right hand springs have coiled portions 72 supported on the spacer sleeves 30 with one leg 73 pressed against flanges 76 of the rear plate 19 and its other leg 74 pressing against the upper outwardly edge 63 of the anvil plates 32 to thereby constantly hold their shaped upper ends 34 in engagement with the outwardly edges 26, the notches 59 and the cam 58 of the driver 25 as it is moved with and in relation to the anvil plates 32 to thereby move their projections 33 out of staple bending position and to releasably hold their shaped upper ends 34 in notches 59 of the driver 25 as it is reciprocated.

I claim:

1. Stapling mechanism comprising a frame, a driver with cam surfaces reciprocable therein, a staple guide adapted to guide staples to a position in the path of said driver, pivoted anvil plates mounted for upward and downward movement on said frame and having projections at their lower ends for piercing material to be stapled and for bending the legs of a staple as it is driven downwardly, pivot means on said anvil plates and pivot guiding means for said pivot means on said frame for limiting downward movement of said anvil plates after they have penetrated said material, releasable interlocking means below said cams between said driver and the upper ends of said anvil plates for moving the die plates downwardly to penetrate said material, control means operated by said driver to move and then hold the upper end of said anvil plates in interlocking position with said driver during its upwardly reciprocating movement, and means to release said anvil plates during downward movement of said driver to permit it to move its cams downwardly into engagement with the upper ends of said anvil plates to shift its projections into staple bending position.

2. A stapling mechanism as in claim 1 and further characterized by means on said frame for adjusting said guiding means to change the position of the pivot of said anvil plates to obtain various bends to the staple's legs as it is driven.

3. A stapling mechanism as in claim 2 and further characterized by spring means between said guide means and said frame for holding said guiding means in a set position.

4. Stapling mechanism comprising a frame, a driver with cam surfaces reciprocable therein, a staple guide adapted to guide staples to a position in the path of said driver, pivoted anvil plates mounted for upward and downward movement on said frame and having projections at their lower ends for piercing material to be stapled and for bending the legs of a staple as it is driven downwardly, pivot means on said anvil plates and pivot guiding means for said pivot on said frame to limit downward movement of said anvil plates after they have penetrated said material, releasable interlocking means below said cams between said driver and the upper ends of said anvil plates for moving the anvil plates downwardly to penetrate said material, and resilient means for holding said upper ends of said anvil plates in engagement with said driver during its downward movement.

5. Stapling mechanism comprising a frame, a driver reciprocable therein, a staple guide adapted to guide staples to a position in the path of said driver, pivoted anvil plates mounted for upward and downward movement on said frame and having projections at their lower ends for piercing material to be stapled and for bending the legs of a staple as it is driven downwardly, interlocking means between said driver and the upper ends of said anvil plates for moving the anvil plates downwardly to penetrate said material, and means operated by said driver for holding said anvil plates interlocked with said driver during a portion of said driver's downward movement.

References Cited in the file of this patent

UNITED STATES PATENTS

| | | |
|---|---|---|
| 420,074 | Jones | Jan. 28, 1890 |
| 1,591,986 | Maynard | July 13, 1926 |
| 2,488,940 | Schafroth | Nov. 22, 1949 |
| 2,722,002 | Allen | Nov. 1, 1955 |

U. S. DEPARTMENT OF COMMERCE
PATENT OFFICE

CERTIFICATE OF CORRECTION

Patent No. 2,814,042     Herman J. Spencer     November 26, 1957

It is hereby certified that error appears in the printed specification of the above numbered patent requiring correction and that the said Letters Patent should read as corrected below.

Column 6, line 72, strike out "downward movement on said frame and having projec-" and insert the same following the words "upward and" in line 69, same column.

Signed and sealed this 24th day of June 1958.

(SEAL)
Attest:
KARL H. AXLINE

Attesting Officer

ROBERT C. WATSON
Commissioner of Patents